United States Patent [19]

Garman et al.

[11] Patent Number: 5,222,429
[45] Date of Patent: Jun. 29, 1993

[54] PISTON ASSEMBLY FOR A HYDRAULIC CYLINDER

[75] Inventors: James A. Garman, Eureka; Ali A. Bitar, Peoria, both of Ill.

[73] Assignee: Caterpillar Inc., Peoria, Ill.

[21] Appl. No.: 881,038

[22] Filed: May 11, 1992

[51] Int. Cl.$^5$ .................................. F16J 1/06
[52] U.S. Cl. ........................ 92/193; 92/172; 92/5 R; 324/635; 324/636; 277/163; 277/157
[58] Field of Search ............ 92/5 R, 193, 200, 198, 92/172; 91/1; 324/633, 635, 636, 639, 640; 277/163, 157

[56] References Cited

U.S. PATENT DOCUMENTS

| | | | |
|---|---|---|---|
| 229,613 | 7/1880 | Jamieson | 277/163 |
| 624,365 | 5/1899 | Mullen | 92/193 |
| 1,473,446 | 11/1923 | Scott | 277/163 |
| 1,703,905 | 3/1929 | Solenberger | 92/90 |
| 2,962,331 | 11/1960 | Folkerts | 309/28 |
| 3,068,018 | 12/1962 | Tydeman | 277/165 |
| 4,522,412 | 6/1985 | Kubo | 277/163 |
| 5,139,276 | 8/1992 | Balsells | 277/163 |

FOREIGN PATENT DOCUMENTS

| | | | |
|---|---|---|---|
| 0974917 | 2/1951 | France | 277/157 |
| 0596000 | 12/1947 | United Kingdom | 277/157 |

Primary Examiner—Thomas E. Denion
Attorney, Agent, or Firm—John W. Grant

[57] ABSTRACT

The fluid seals on the currently available piston assemblies are ineffective for blocking the leakage of electrical signals between the piston and the cylinder. The present invention utilizes an electrically conductive split ring seated in an annular groove in a piston and an electrically conductive annular spring disposed between the split ring and the piston to resiliently urge the split ring into conductive engagement with the hydraulic cylinder while providing continuous electrical contact between the split ring and the piston to block the leakage of electrical signals.

8 Claims, 2 Drawing Sheets

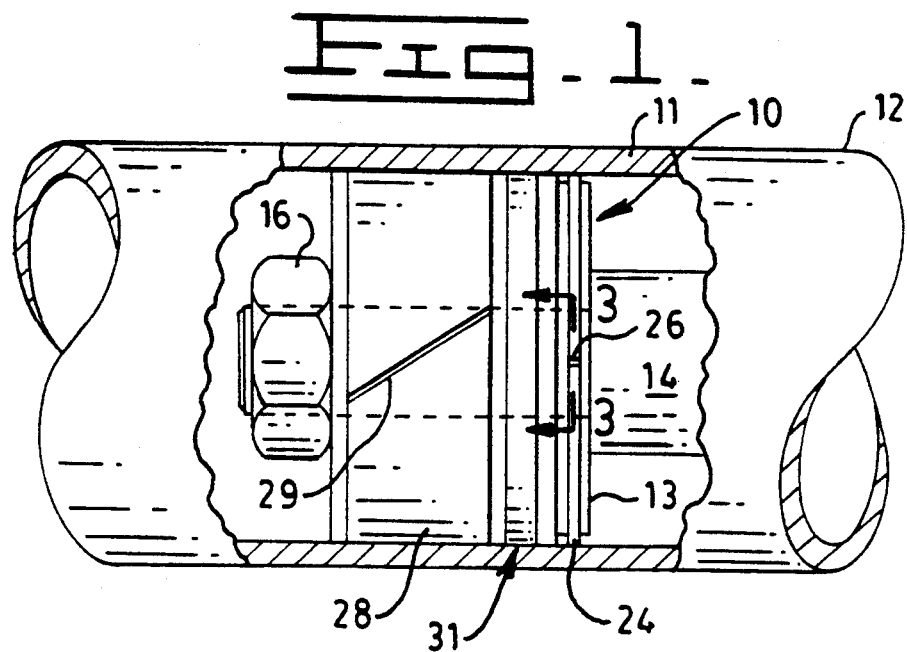
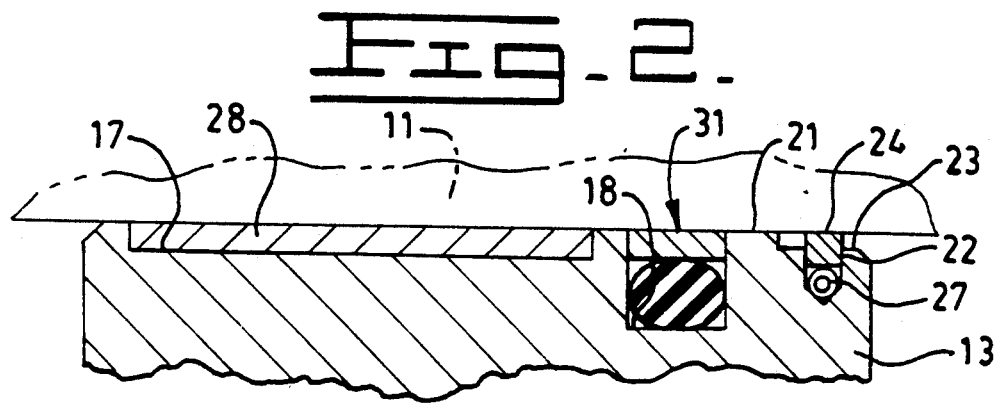

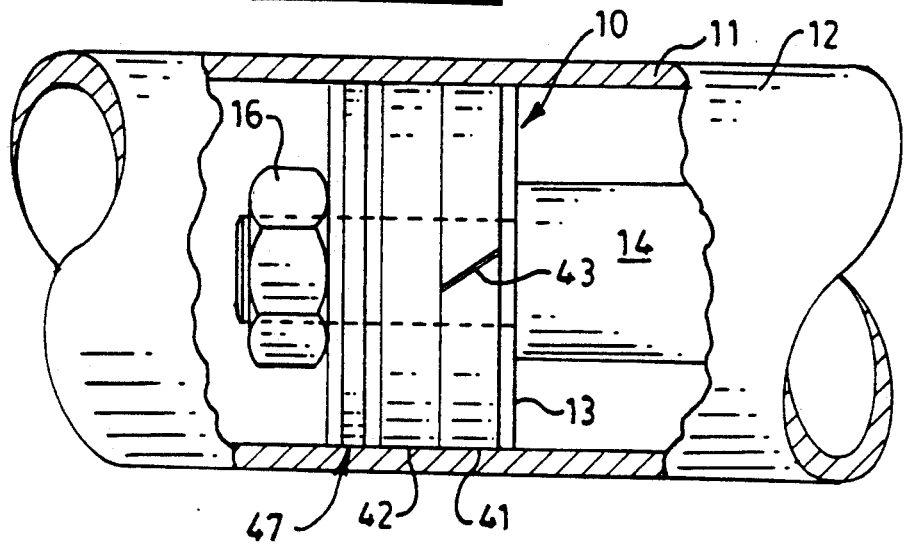
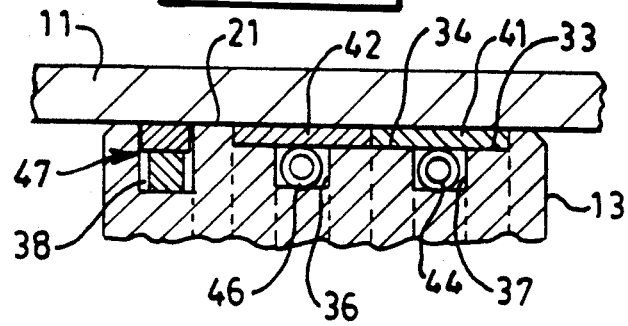
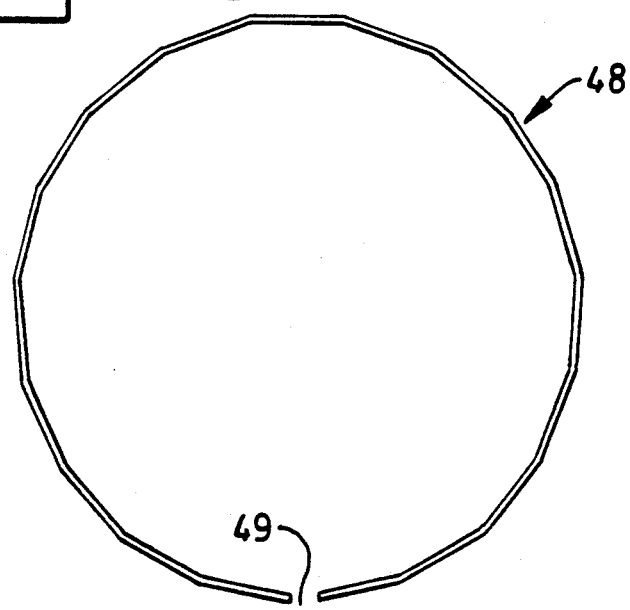

PISTON ASSEMBLY FOR A HYDRAULIC CYLINDER

DESCRIPTION

1. Technical Field

This invention relates to a hydraulic cylinder and more particularly to a piston assembly therefor.

2. Background Art

Expandable chamber hydraulic cylinders are widely used in industrial and earthmoving type vehicles. The recent trend is to automatically control the extension and retraction of the hydraulic cylinders to achieve semi or totally automatic operating cycles. Some automatic controls rely on sensing the position of the pistons of the hydraulic cylinders for operation. One type of position sensor uses radio frequency (RF) signals within the actuating chamber of the hydraulic cylinder. The RF signals are transmitted from one RF probe and received by another RF probe positioned within the actuating chamber. One of the problems encountered therewith is that the RF signals tend to leak past the conventional oil seals and wear bands circumscribing the piston. Such leakage is detrimental to the efficiency and accuracy of the position sensor.

Thus, it would be desirable to have a piston assembly which blocks the leakage of RF signals past the piston so that the efficiency of the position sensor is improved. It is also desirable to provide an electrical connection between the piston and the cylinder wall in order to insure the integrity of the cavity containing the RF probe.

The present invention is directed to overcoming one or more of the problems as set forth above.

DISCLOSURE OF THE INVENTION

In one aspect of the present invention, a piston assembly is provided for a hydraulic cylinder adapted for use with a radio frequency piston position sensor and having a tubular cylinder. The piston assembly includes a piston slidably disposed in the tubular cylinder and defining an annular groove therein, an electrically conductive split ring seated in the annular groove, and an electrically conductive spring disposed between the split ring and the piston resiliently urging the split ring into conductive engagement with the tubular cylinder and providing continuous electrical contact between the split ring and the piston.

BRIEF DESCRIPTION OF THE DRAWINGS

FIG. 1 is a cross-sectional view of an embodiment of the present invention;

FIG. 2 is an enlarged sectional view of a portion of FIG. 1;

FIG. 3 is an enlarged sectional view taken along line 3—3 of FIG. 1;

FIG. 4 is a cross-sectional view of another embodiment of the present invention;

FIG. 5 is an enlarged sectional view of a portion of FIG. 4; and

FIG. 6 is an elevational view of an alternate component of the present invention.

BEST MODE FOR CARRYING OUT THE INVENTION

Referring to FIGS. 1-3, a piston assembly 10 is shown slidably disposed within a tubular cylinder 11 of a hydraulic cylinder 12 for use with a radio frequency position sensor (not shown). The piston assembly 10 includes a cylindrical piston 13 disposed within the tubular cylinder 11 and is suitably secured to a piston rod 14 with a nut 16 in the usual manner. The piston has a plurality of flat bottomed annular grooves 17,18 axially spaced along an outer peripheral surface 21 thereof. A v-bottomed annular groove 22 is formed in a reduced diameter portion 23 of the piston adjacent the annular groove 18.

A split ring 24 is disposed in the groove 22 and has a split locking joint 26 therein to permit limited radial expansion thereof. The split ring 24 is preferably made from an electrically conductive material such as cast iron. An annular canted coil spring 27 is seated in the groove 22 between the piston 13 and the split ring 24 and is sized to expand the split ring 24 in conductive engagement with the cylinder 11. The canted spring 27 is preferably made from an electrically conductive material, such as metal, to provide continuous electrical contact between the split ring 24 and the piston 13. An annular wear band 28 is seated in the annular groove 17 and has a diagonal split 29 therein. The wear band is preferably made from an electrically conductive material such as aluminum, electrically conductive plastic material, etc. A conventional two-piece fluid seal assembly 31 is seated in the annular groove 18 and sealingly engages the cylinder 11.

Another embodiment of a piston assembly 10 of the present invention is disclosed in FIGS. 4 and 5. It is noted that the same reference numerals of the first embodiment are used to designate similarly constructed counterpart elements of this embodiment. In this embodiment, however, an annular groove 33 formed in the outer peripheral surface 21 has a cylindrical bottom surface 34 and a pair of axially spaced annular grooves 36,37 formed in the bottom surface. Another annular groove 38 is formed in the peripheral surface 21 and is axially spaced from the annular groove 36. A pair of rings 41,42 are seated in the annular groove 36 in end-to-end relationship with each ring having a diagonally extending split as shown at 43 to provide for limited radial expansion thereof. Each of the split rings 41,42 are constructed from an electrically conductive material such as aluminum or the like. A pair of canted annular springs 44,46 are individually seated in the annular grooves 36,37 and are sized to resiliently expand the respective split ring 41,42 into electrically conductive engagement with the cylinder 11. The canted spring is preferably constructed from an electrically conductive material to provide continuous electrical contact between the ring and the piston 13.

A two-piece fluid seal assembly 47 is suitably seated in the annular groove 38 and seals against the cylinder 11.

FIG. 6 shows another metallic spring 48 which can be used in place of the canted spring 27 or 44,46. The spring 48 can be made, for example, from a round wire formed into a regular polygonal shape and is provided with an opening 49 to facilitate installation thereof.

INDUSTRIAL APPLICABILITY

In the use of the embodiment of FIGS. 1-3, the fluid seal assembly 31 blocks fluid leakage between the piston 13 and the cylinder 11 in the usual manner. The split ring 24 and canted spring 27 function as a primary seal to block the leakage of electrical signals between the piston 13 and the cylinder. More specifically, the canted spring 27 continuously resiliently urges the split ring 24 into conductive engagement with the cylinder 11 and provides continuous electrical contact between the split ring 24 and the piston. Moreover, the wear band 28 also makes electrical contact between the piston and the cylinder 11 for additional blockage of electrical signals between the piston and the cylinder.

In the use of the embodiment of FIGS. 4 and 5, the seal assembly 47 blocks the leakage of fluid between the piston 13 and the cylinder 11 while the split rings 41,42 and canted springs 44,46 serve to block the leakage of electrical signals between the piston and the cylinder. More specifically, the canted springs 44,46 resiliently urge the split rings 41,42 into conductive engagement with the cylinder 11 and also provide continuous electrical contact between the rings and the piston.

In view of the above, it is readily apparent that the present invention provides for sealing between the piston and the cylinder to prevent leakage of electromagnetic signals between the piston and the cylinder. The annular canted springs continuously urge the split rings into conductive engagement with the cylinder and provide continuous electrical contact between the ring and the piston. This electrical conductive path blocks the leakage of electrical signals between the piston and the cylinder thereby making the RF position sensor more efficient.

Other aspects, objects, and advantages of the present invention can be obtained from a study of the drawings, the disclosure, and the appended claims.

We claim:

1. A piston assembly in combination with a hydraulic cylinder having a tubular cylinder and adapted for use with a radio frequency piston position sensor, comprising:

a piston disposed in the cylinder and defining first and second annular grooves therein;

a two-piece fluid seal assembly disposed within the first annular groove and having a first seal engaging the tubular cylinder and a second seal disposed between the first seal and the piston;

an electrically conductive split ring seated in the second annular groove; and an electrically conductive spring disposed between the split ring and the piston and resiliently urging the split ring into conductive engagement with the cylinder and providing continuous electrical contact between the ring and the piston.

2. The piston assembly of claim 1, wherein the piston defines another annular groove therein and including another electrical conductive split ring seated in the another groove.

3. The piston assembly of claim 1, wherein the spring is an annular canted coil spring made from metal.

4. The piston assembly of claim 1, wherein the spring has a polygonal shape and is provided with an opening therein.

5. The piston assembly of claim 3, wherein the split ring is made from cast iron.

6. The piston assembly of claim 3, wherein the second annular groove has a cylindrical bottom surface, the piston defining a third annular groove which is formed in the bottom surface, said metallic spring being seated in the third annular groove.

7. The piston assembly of claim 6, including another electrically conductive split ring seated in the second annular groove in end-to-end relation with the first mentioned split ring, said piston defining a fourth annular groove formed in the bottom surface, and another metallic spring seated in the fourth annular groove resiliently urging the second split ring into conductive engagement with the cylinder.

8. The piston assembly of claim 7, wherein the split rings are made from aluminum.

* * * * *